(No Model.)

G. CUTTER.
SAP EVAPORATOR.

No. 244,983. Patented Aug. 2, 1881.

Witnesses:
John Grist
Fred J. Ross

Inventor
Geo. Cutter
By Henry Grist
Attorney.

UNITED STATES PATENT OFFICE.

GEORGE CUTTER, OF SUTTON, QUEBEC, CANADA.

SAP-EVAPORATOR.

SPECIFICATION forming part of Letters Patent No. 244,983, dated August 2, 1881.

Application filed May 31, 1881. (No model.)

*To all whom it may concern:*

Be it known that I, GEORGE CUTTER, of Sutton, in the county of Brome, in the Province of Quebec, Canada, have invented certain new and useful Improvements in Sap-Evaporators; and I do hereby declare that the following is a full, clear, and exact description of the same.

The object of this invention is to construct an evaporator for reducing sap and juice to sirup, wherein the pan is removably seated over a furnace, to admit of being canted to drain the contents; and in passing the products of combustion through pipes in the pan, to economize fuel; and in subdividing the pan, whereby cold sap fed to one section will pass to another section and follow through the other sections until the required density of sirup is obtained without removal from the pan.

My invention consists, in combination with a fire block or furnace having a chimney or smoke-stack at its end above the furnace-door, of a removable pan over the fire-chamber, said pan subdivided transversely and longitudinally into sections, each longitudinal section having a flue pipe or pipes from the bottom of the pan to its front end to connect with the smoke-stack, whereby the products of combustion pass under the bottom of the pan and return through the pipes within the pan to the chimney, the sap flowing from one section of the pan to another during the progress of evaporation.

Figure 1:
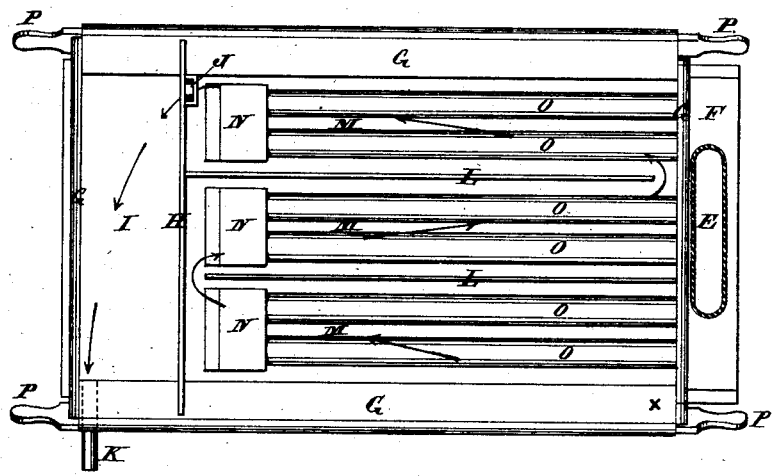
Figure 2:
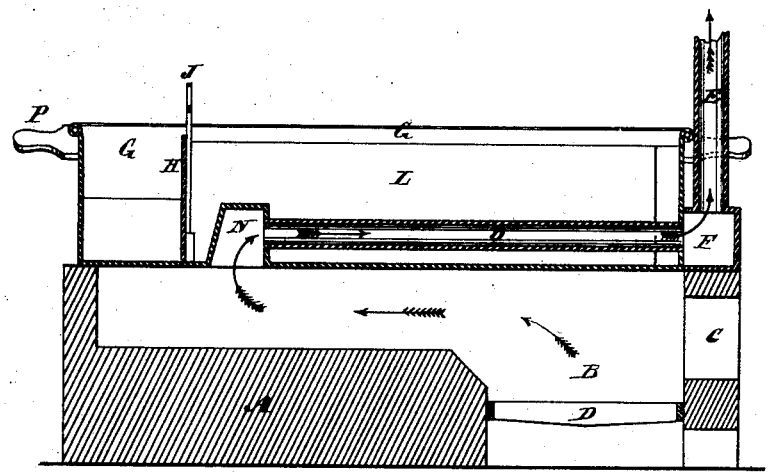
Figure 3:
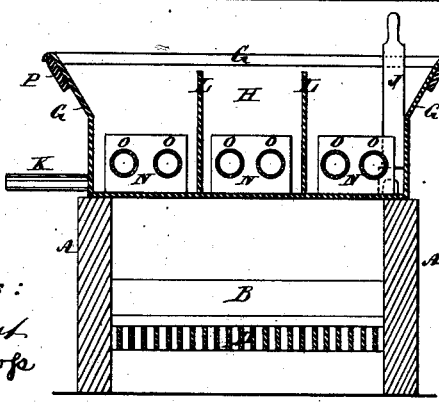

Figure 1 is a top view of my improved evaporator. Fig. 2 is a longitudinal vertical section, and Fig. 3 is a transverse section of the same.

A is the fire-block; B, the furnace or fire-chamber; C the door, and D the grate-bars, of the same. E is the smoke-stack or chimney from a smoke box or chamber, F, above the front wall of the furnace.

G is a rectangular evaporating-pan, its bottom bearing on the walls of fire-block A, and covering its fire section or chamber. The pan is divided transversely at its rear end by a partition, H, to form a section, I, into which the sirup is admitted when of the required density by a gate, J, and drawn off by a valved pipe, K. From the partition H the pan is divided longitudinally by partitions L to form sections M, through which the sap flows from one section to another in alternate directions during the process of evaporation. The sap is fed in a cold state into the sections at the point *x*.

The bottom of the pan near the end of sections M farthest from the fire is raised inwardly to form a chamber or chambers, N, for connection of a pipe or pipes, O, running longitudinally of the sections internally and through the end of the pan into a smoke-chamber, F, over the front fire-wall, said chamber connecting with a smoke-stack or chimney, E, whereby the heat and smoke from the fire-chamber pass rearwardly under the bottom of the pan; then upwardly through the bottom; thence through the flues O within the pan into the smoke-chamber F, and out through the chimney E.

The connection of the flues O with the chamber F is such that the open side of the chamber is closed by the end of the pan abutting against it to allow the pan to be removed from the fire by means of handles P on the longitudinal sides of the pan, whereby the pan can be canted to drain off its contents in a thorough manner when desired, to prevent discolorization of the sap when the pan is again used.

The flues, instead of entering chambers N, may pass by a bend through the bottom of the pan.

The plain arrows show the current of the sap, and the feathered arrows the course of the smoke and other products of combustion.

I claim as my invention—

1. In combination with a furnace-block, A, having a smoke-chamber, F, and chimney E over the front wall, the evaporating-pan G, composed of transverse section I and longitudinal sections M, and having internal smoke-flues O passing through the bottom of the pan and connecting with smoke-chamber F through the front end of the pan, as set forth.

2. An evaporating-pan composed of transverse section I and longitudinal sections M, the latter containing smoke-flues O, as set forth.

3. An evaporating-pan, G, provided with internal smoke-pipes O, passing through the bottom and end of the pan and handles P, and adapted to be removed from the fire and canted to drain off the contents, as described, combined with a furnace-block, A, of which the pan forms the top, having smoke-stack located in front of the fire-chamber, as and for the purpose set forth.

GEO. CUTTER.

Witnesses:
GRAYSON R. FOWLER,
W. H. O. REGAN.